Patented Feb. 24, 1942

2,274,620

UNITED STATES PATENT OFFICE 2,274,620

SUBSTITUTED ARYL AMIDES OF PYRIDINE CARBOXYLIC ACID

Lester J. Szabo, Cleveland, Ohio, assignor to S. M. A. Corporation, Chicago, Ill., a corporation of New Jersey No Drawing. Application January 2, 1940, Serial No. 312,150

1 Claim. (Cl. 260—295)

Phenetidine is extensively used as an antipyretic and analgesic for the reduction of temperature of fever and the relief of pain. It undergoes decomposition in the system yielding para-aminophenol or acetyl aminophenol. Care must be exercised in its administration since it produces dangerous side effects such as hemolysis and depression of the heart.

I have discovered that a combination of phenetidine with nicotinic acid to form nicotinylphenetidine by substitution will give an antipyretic and analgesic less conducive to the objectionable side effects inherent in phenetidine as usually made and prescribed.

The invention, therefore, relates to the formation of pyridine carboxyl arylamides or compounds of the general formula R—NHCO—X, wherein R is a substituted aryl group, NH is an amino group in aryl residue, CO is a carbonyl group of pyridine carboxylic acid and X is alpha, beta or gamma pyridyl.

The linkage may be accomplished by various methods, of which the following are illustrative examples.

Example 1

A mixture of 10 grams nicotinic acid and 11.5 grams phenetidine are heated for about three hours at a temperature of approximately 150° C. This may be done in either an open or closed vessel but care should be taken relative to the evolved gas, since it is toxic. Phenetidine may be recovered from the vapors thus formed. If necessary the mass may be stirred. Upon cooling a dark mass separates, being the crude nicotinylphenetidine. This is pressed to remove excess phenetidine and crystallized several times from boiling alcohol. Only the minimum quantity of alcohol necessary is used and the crystallization is accomplished by the careful addition of water. For the first and second crystallization steps little or no water is used, subsequent steps requiring water at room temperature.

The refined nicotinylphenetidine or p-phenetylamide of nicotinic acid thus prepared crystallizes in pale pink to colorless long needles practically insoluble in cold water, slightly soluble in cold alcohol, very slightly soluble in boiling water and soluble in boiling alcohol. It is appreciably soluble in hot organic solvents such as ether or the like. On slow crystallization from alcohol it separates in large prismatic needles. Its melting point is 172–3° C. (uncorrected) and after recrystallization from alcohol, from benzene or acetone the melting point is 165° C. (uncorrected).

The reaction is indicated by the following

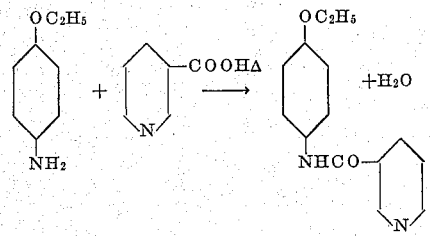

Example 2

Starting with two molecular proportions of phenetidine it is added to one molecular proportion of nicotinyl chloride and the mixture warmed to a suitable temperature. The excess of phenetidine is used to take up the free hydrochloric acid formed during the reaction or the resulting hydrochloric acid may be removed by the necessary quantity of dilute alkali. I have found that about 10% of a sodium hydroxide solution will give the desired result. When alkali is used, only one molecular proportion of phenetidine is used. The separated solid is then purified as in Example 1, after washing out the phenetidine-hydrochloride with water when the alkali is not used.

The reaction is indicated as follows:

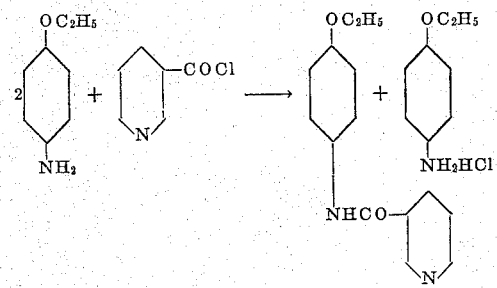

Example 3

Using as a starting point either the nicotinic acid and phenetidine of Example 1 or the proportions of phenetidine and nicotinyl chloride of Example 2, the heating is done in the presence of a high boiling point liquid, such as vegetable or mineral oil or a hydrocarbon as xylene. The separated solid secured must be pressed to not only remove the phenetidine unaffected by the reaction but also any of the oil adhering to the solid. Purification follows as in Example 1.

Example 4

One mol of pyridine-carboxylchloride is treated with one mol of an arylamine in the presence of a hydrochloric acid binding substance such as pyridine, by gradual addition with cooling, of the arylamine pyridine mixture to the pyridine-carboxyl-chloride. The resultant mixture is warmed on a steam bath for from two to eight hours depending upon the arylamine used. The mixture is then cooled and treated with water. The insoluble pyridine carboxyl arylamide is then filtered off, dried and recrystallized from boiling alcohol with the use of decolorizing carbon.

The reaction is indicated as follows:

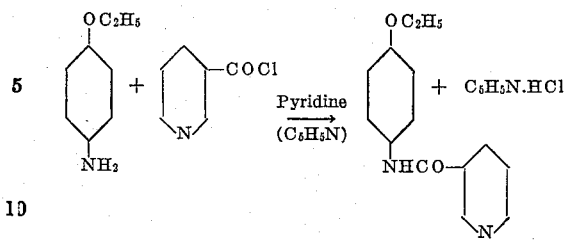

Nicotinylphenetidine prepared as above can be administered with a lessening of the usual side effects of phenetidine. It is believed that this is due in part to the vitamin nature of the nicotinyl residue, in part to its low solubility thereby prolonging its action and in part to its resistance to hydrolysis. The compound apparently possesses antiseptic properties.

I claim:

Nicotino-p-phenetidide.

LESTER J. SZABO.